(12) United States Patent
Yashiki

(10) Patent No.: US 7,398,297 B2
(45) Date of Patent: Jul. 8, 2008

(54) EMAIL RECEIVER AND METHOD OF RECEIVING EMAIL

(75) Inventor: Satoshi Yashiki, Yokohama (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 725 days.

(21) Appl. No.: 10/035,231

(22) Filed: Jan. 4, 2002

(65) Prior Publication Data

US 2002/0091781 A1 Jul. 11, 2002

(30) Foreign Application Priority Data

Jan. 10, 2001 (JP) ............................. 2001-002836

(51) Int. Cl.
 *G06F 15/16* (2006.01)
(52) U.S. Cl. ..................... 709/206; 358/1.14; 358/1.15; 358/402
(58) Field of Classification Search ................ 709/200, 709/206; 350/437; 358/1.14–1.16, 402–407
 See application file for complete search history.

(56) References Cited

U.S. PATENT DOCUMENTS

| | | | | |
|---|---|---|---|---|
| 5,031,179 A | * | 7/1991 | Yoshida et al. | 714/748 |
| 5,481,374 A | * | 1/1996 | Tachibana et al. | 358/444 |
| 5,535,015 A | * | 7/1996 | Yoshida | 358/438 |
| 5,881,233 A | | 3/1999 | Toyoda et al. | |
| 5,892,587 A | * | 4/1999 | Okada et al. | 358/402 |
| 6,128,101 A | * | 10/2000 | Saito | 358/402 |
| 6,433,893 B1 | * | 8/2002 | Murayama | 358/434 |
| 6,545,768 B1 | * | 4/2003 | Matsubara et al. | 358/1.15 |
| 6,600,750 B1 | * | 7/2003 | Joffe et al. | 370/401 |
| 6,625,642 B1 | * | 9/2003 | Naylor et al. | 709/206 |
| 6,674,541 B1 | * | 1/2004 | Kamiyama et al. | 358/1.15 |
| 6,862,114 B1 | * | 3/2005 | Hayashi | 358/437 |
| 7,142,550 B1 | * | 11/2006 | Umansky | 370/401 |
| 2002/0054335 A1 | * | 5/2002 | Sekiguchi | 358/1.15 |

FOREIGN PATENT DOCUMENTS

JP 3-62672 3/1991

(Continued)

OTHER PUBLICATIONS

English Language abstract of JP 2000-270142.

(Continued)

*Primary Examiner*—William C. Vaughn, Jr.
*Assistant Examiner*—Greg Bengzon
(74) *Attorney, Agent, or Firm*—Greenblum & Bernstein, P.L.C.

(57) ABSTRACT

Upon occurrence of memory overflow, a POP3 protocol process section interrupts email reception by POP3 and stores a page count number at the interruption in the data memory area as the interrupted page number. After that, POP3 protocol process section starts reception of the remainder of the interrupted email data connecting to POP3 server. Comparing the receiving page number and the interrupted page number, the POP3 protocol section identifies the data as the data corresponding to the pages received if the former number is smaller than the latter number. If the data corresponds to the pages received, the data is deleted from the reception buffer without any processing. On the other hand, if the data corresponds to non-received pages, then the data is received and printed out after decoding.

16 Claims, 9 Drawing Sheets

FOREIGN PATENT DOCUMENTS

| | | |
|---|---|---|
| JP | 8-242326 | 9/1996 |
| JP | 9-298658 | 11/1997 |
| JP | 11-284830 | 10/1999 |
| JP | 2000-270142 | 9/2000 |

OTHER PUBLICATIONS

English Language abstract of JP 3-62672.
English Language abstract of JP 9-298658.
English Language abstract of JP 11-284830.

* cited by examiner

EMAIL RECEIVER AND METHOD OF RECEIVING EMAIL

BACKGROUND OF THE INVENTION

1. Field of Invention

The present invention relates to an email receiver and method of receiving email.

2. Description of Related Art

In recent years, an email-type Internet facsimile apparatus (hereafter referred to as IFAX) that communicates data via the Internet using email as disclosed in Japanese Patent Laid-open No. 8-242326 and corresponding U.S. Pat. No. 5,881,233, has been put to practical use.

Such IFAX is provided with the same configuration and user interface as G3/G4 facsimile apparatus used in an office or a home. In other words, the operational components of the IFAX is installed in a single housing or case, is operated from a panel comprising ten-key, one touch buttons, etc. and provides information to a user by relatively small LCD display.

Procedures by which the IFAX receives email will now be briefly described. The IFAX accesses a reception mail server (for example, POP3 server) and stores attached image files (facsimile data) in an image memory while receiving an email stored in the mail box assigned to the owner's mail account. After the completion of email reception, image files are decompressed and outputted to a printer.

However, in a conventional IFAX, a capacity of an image memory for storing image files is in most cases not necessarily large enough. In such a situation, it is assumed that the image memory has a memory overflow while receiving an email and there is no choice but to interrupt email reception at that moment. Usually when the IFAX does not receive an email normally, the email is left in the reception server without being erased. As the result, when the IFAX accesses the reception server again, it tries to receive the remaining email again and the reception should be interrupted because memory overflow occurs during in the middle of the reception. Although it is possible to set up the IFAX so that a failed email is erased from the reception mail server, in this case all images attached to the email are not received.

SUMMARY OF THE INVENTION

An object of the present invention is to provide an email receiver that makes it possible to receive email data without repeating email reception because of memory overflow even when the email data is large.

In the present invention, in order to solve the problem mentioned above, the email receiver interrupts receiving email data, leaving the email data in the reception mail server when memory overflow occurs during receiving the email data. When the email receiver receives the email data left in the reception mail server after interruption, the email receiver receives the remaining data, but does not receive the email data previously received by the email receiver before the memory overflow.

Thus it is possible to avoid memory overflow again occurring at re-reception. Also, since it is not necessary to erase or skip the email data from the reception mail server when interruption has occurred, it is possible for an email receiver with small memory capacity to receive and to reliably output the email data of a size larger than the memory capacity.

BRIEF DESCRIPTION OF THE DRAWINGS

The present invention is further described in the detailed description which follow, with reference to the noted plurality of drawings by way of non-limiting examples of exemplary embodiments of the present invention, in which like reference numerals represent similar members or items throughout the several views of the drawings, and wherein.

DETAILED DESCRIPTION OF PREFERRED EMBODIMENTS

Figure 1:
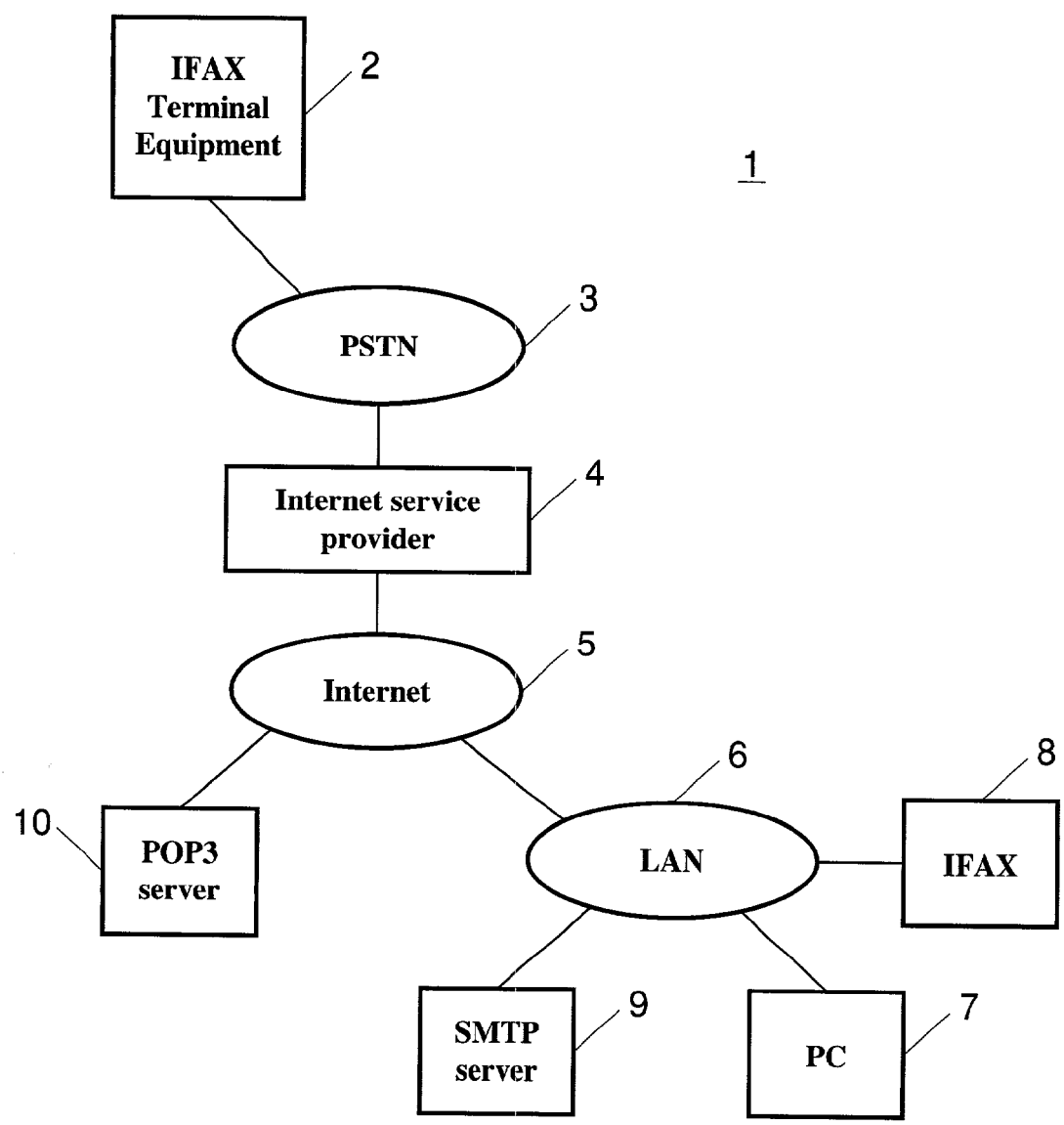
FIG. 1 is a conceptual drawing of computer network system on which the Internet facsimile apparatus of the embodiment of the present invention operates.

Hereafter, preferred embodiments are described in detail using the drawings. FIG. 1 is a conceptual diagram showing a computer network system on which Internet facsimile apparatus of the present invention operates.

In the system 1 shown in FIG. 1, IFAX terminal apparatus 2 is connected to an Internet Service Provider (ISP) 4 via public service telephone network, and is connected to Internet 5 via the ISP4. On the transmitting side, for example, PC7 and IFAX 8 are connected to Internet 5 via LAN 6. SMTP server 9 is connected to LAN 6 as a mail server of transmitting side. POP3 server 10 is connected to Internet 5 as a receiving side device that allocates mail accounts to IFAX terminal apparatus 2. Here IFAX terminal apparatus 2 is connected to ISP4 via PSTN 3 in the system 1. However, it is not limited to this connected and it can be connected via ISDN (Integrated services digital network).

In the system 1 as described, when image data is transmitted from IFAX 8 or PC 7 to IFAX terminal apparatus 2 by email, the email with the image data attached thereto is sent to POP3 server 10 via SMTP server 9, using the mail account of IFAX terminal apparatus 2 as an address. POP3 server stores the received email to the mailbox corresponding to the mail account of IFAX terminal apparatus 2. IFAX terminal apparatus 2 connects to ISP4 periodically or by an instruction of a receiver, and access to POP3 server 10 via Internet 5. Communication with POP3 server is based on POP3 protocol that is one of a plurality of suitable email transfer protocols. IFAX terminal apparatus 2 receives emails and outputs the contents of the email for recording and, or printing when emails are stored in the mailbox.

In this embodiment, an email received by IFAX terminal apparatus 2 is an email with an attached image file. For example, the email is based upon MIME (Multipurpose Internet Mail Extensions) and an image file is stored in the attached file part encoded, for example, as character code in base 64 method. Each part such as a text part and an attached file part is divided by boundaries defined in the header. Further, the file format of the image file is TIFF-FX format defined in RFC2301 of IETF. An image file of TIFF-FX format (hereafter referred to as TIFF file) is of multi-page structure. Each scanned page is compressed in a compression format such as MH, MR, and MMR that are commonly used in facsimile communication and the compressed image information (hereafter referred to as compressed image data) is inserted to each page-area (between sub-header (IFD)). In other words, plural compressed image data corresponding to each of documents is converted to one TIFF file and attached to an email of the IFAX.

Figure 2:
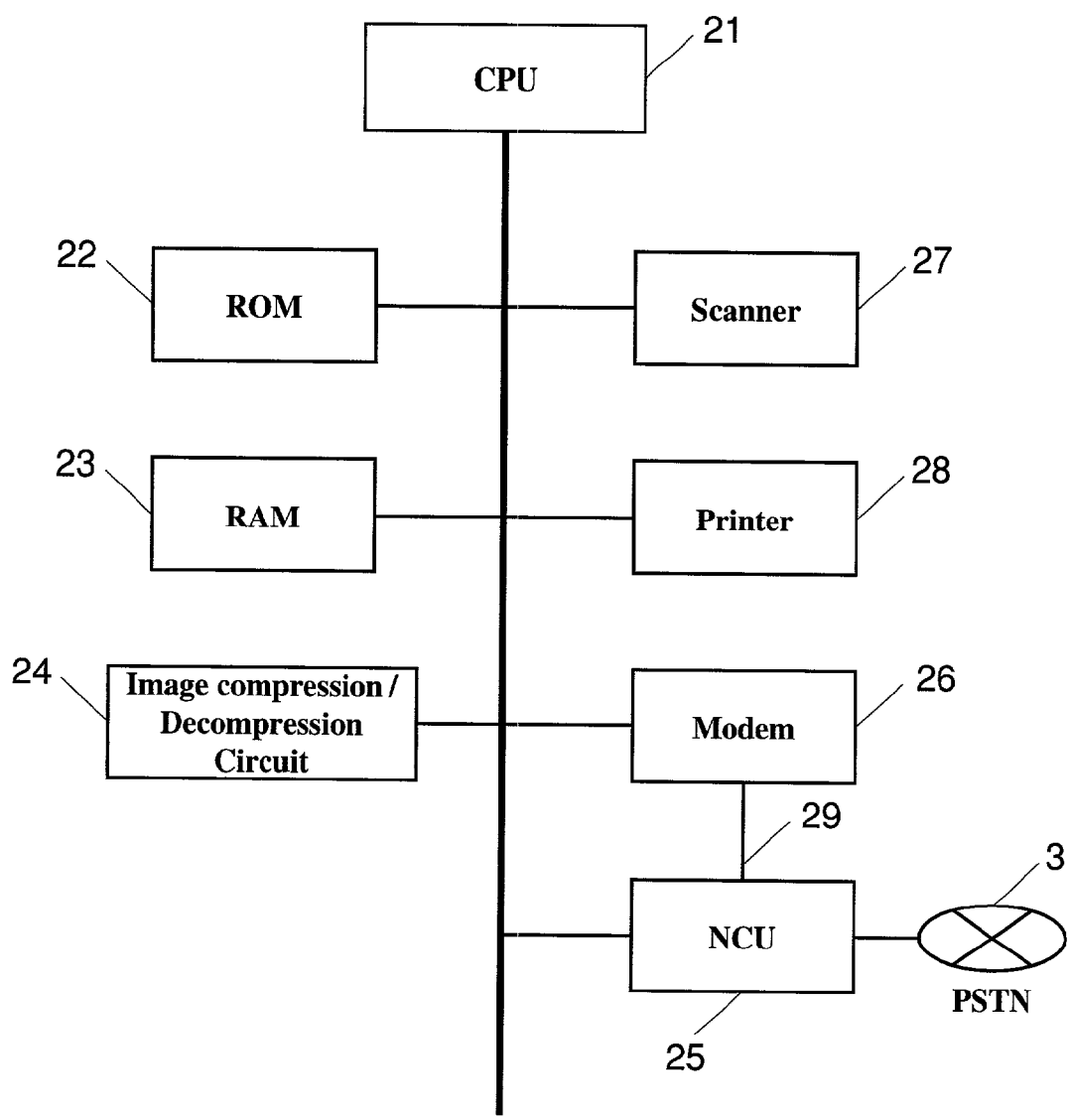
FIG. 2 is a block diagram showing a hardware configuration of the Internet facsimile apparatus of the embodiment mentioned above.

FIG. 2 is a block diagram showing the hardware of Internet facsimile apparatus of the embodiment mentioned above. In the IFAX terminal apparatus 2, CPU 21 executes programs and controls the whole apparatus. ROM 22 stores programs that CPU 21 executes. RAM 23 provides a work area for program execution and also a buffer area for temporarily storing various data such as emails and image data. The compression/decompression circuit 24 compresses image data to be transmitted in accordance with one of MH, MR, and MMR, and decompresses received compressed data to the original data.

The network control unit (NCU) 25 is connected to PSTN 3. A modem 26 is connected via analog signal line 29 to the network control unit 25. The modem 26 modulates/demodulates various data communicated with the destination facsimile apparatus and ISP4. In this example, a modem 26 is connected to ISP4 vial PSTN3, however in another routing a communication device appropriate for the routing is used. For example, when an ISDN is used instead of a PSTN, a terminal adapter and a digital service unit (DSU) are used.

The scanner 27 reads out image data from documents. The printer 28 prints various data including received image data.

Figure 3:
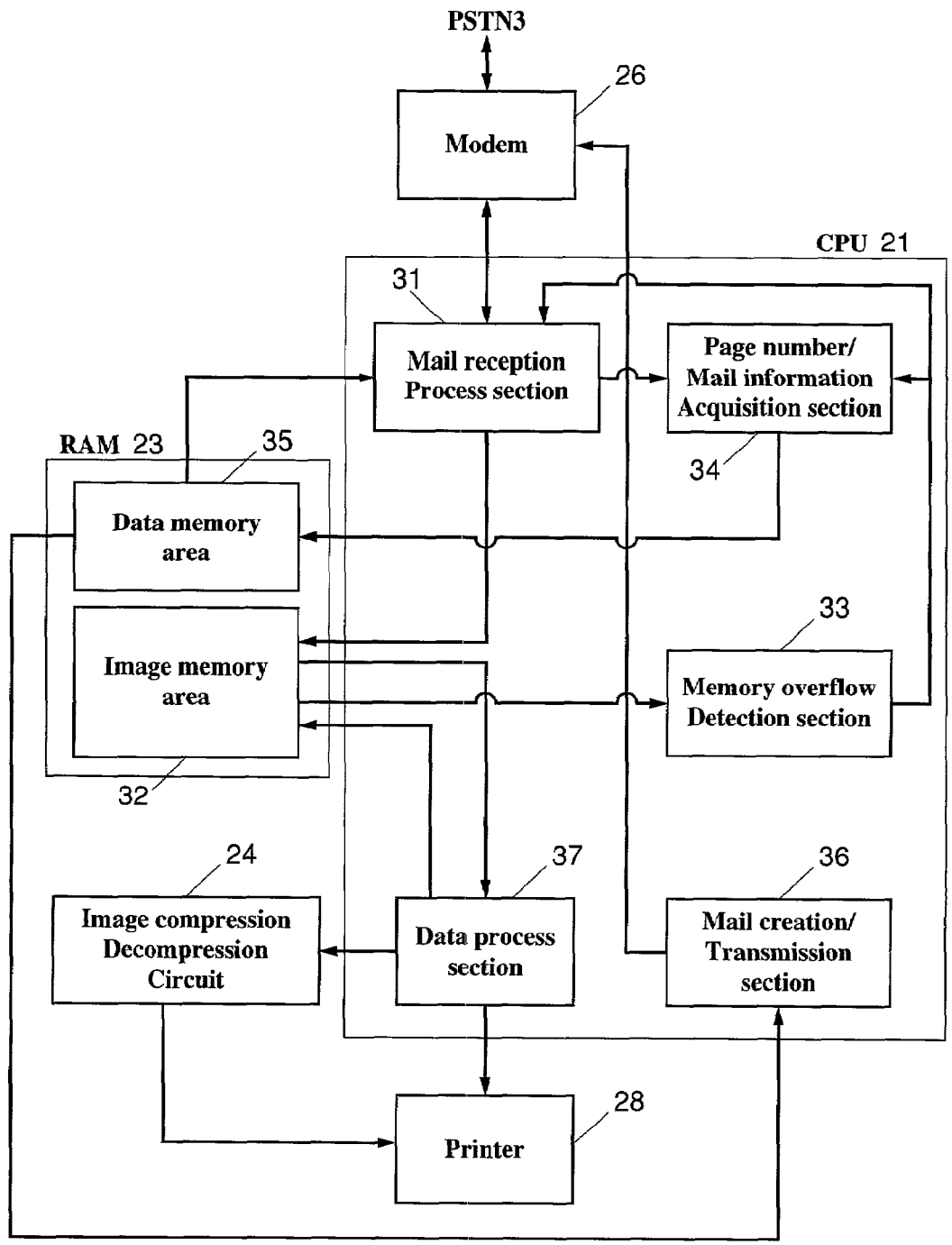
FIG. 3 is a block diagram showing email reception function of the Internet facsimile apparatus of the embodiment mentioned above.

FIG. 3 is a block diagram showing the email reception function of Internet facsimile terminal apparatus of the embodiment mentioned above.

The mail reception process section 31 controls the modem 26 to connect to the ISP4. At the same time, the mail reception process section 31 connects to POP3 server 10 to receive email data addressed to IFAX terminal apparatus 2. Text data in the text part of the received email and compressed image data of TIFF file in the attached file part are sequentially stored in the image memory area 32 provided in RAM 23.

The memory overflow detection section 33 detects the occurrence of memory overflow in the image memory area 32. The memory overflow detection section 33 notifies the mail reception process section 31 and a page number/mail information acquisition section 34.

The page number/mail information acquisition section 34 counts a number of pages of received email. The page number/mail information acquisition section 34 acquires message ID, Subject, and sender's address data of the email that created the overflow from the email data. The mail reception process section 31 receives the interrupted email based on the information such as page number stored in the data memory area 35 at the next access to POP3 server 10. This process will be described in detail later.

The mail creation/transmission process section 36 creates an email (hereafter referred to as an overflow notifying mail) notifying that only a portion of the email was received, when the memory over detection section 33 detects the occurrence of memory overflow in the image memory area 32. After that, the mail creation/transmission process section 36 transmits the overflow notifying mail to the sender.

The data process section 37 retrieves the text data and the compressed image data stored in the image memory area 32 and after appropriate processing, outputs the data to the printer 28 to print the data.

Figure 4:
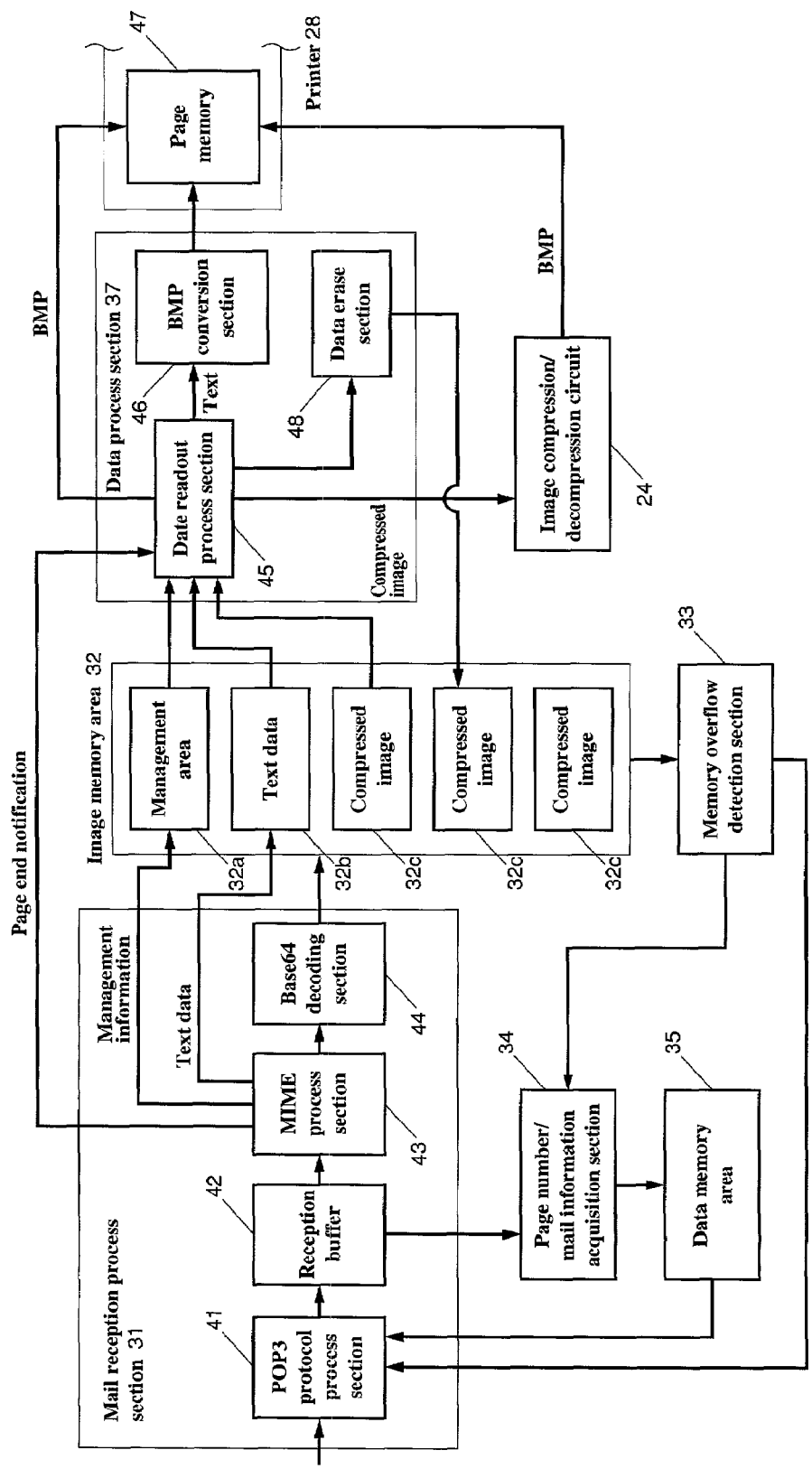
FIG. 4 is a block diagram for describing in detail the mail reception process section and the data process section of the Internet facsimile apparatus of the embodiment mentioned above.

FIG. 4 is a block diagram for describing the mail reception process section 31 and the data process section of Internet facsimile terminal apparatus of the embodiment described above in detail. In the mail reception process section 31, POP3 protocol process section 41 executes POP3 protocol with POP3 server 10. In other words, after connecting to POP3 server 10 and getting authentication using "USER" and "PASS", POP3 protocol process section 41 reads out mails using commands such as "STAT", "LIST", "RETR", and "QUIT".

The email data received by POP3 protocol process section 41 are sequentially outputted to a reception buffer 42. The page number/mail information acquisition section 34 counts page numbers from the reception buffer 42. In other words, it counts page numbers of compressed image data in the TIFF file attached to an email. For example, a page number can be recognized from the contents of IFD (Image Field Directory) in the TIFF file. The page number/mail information acquisition section 34 acquires an message ID, subject, and sender's address from the email data.

Figure 5:
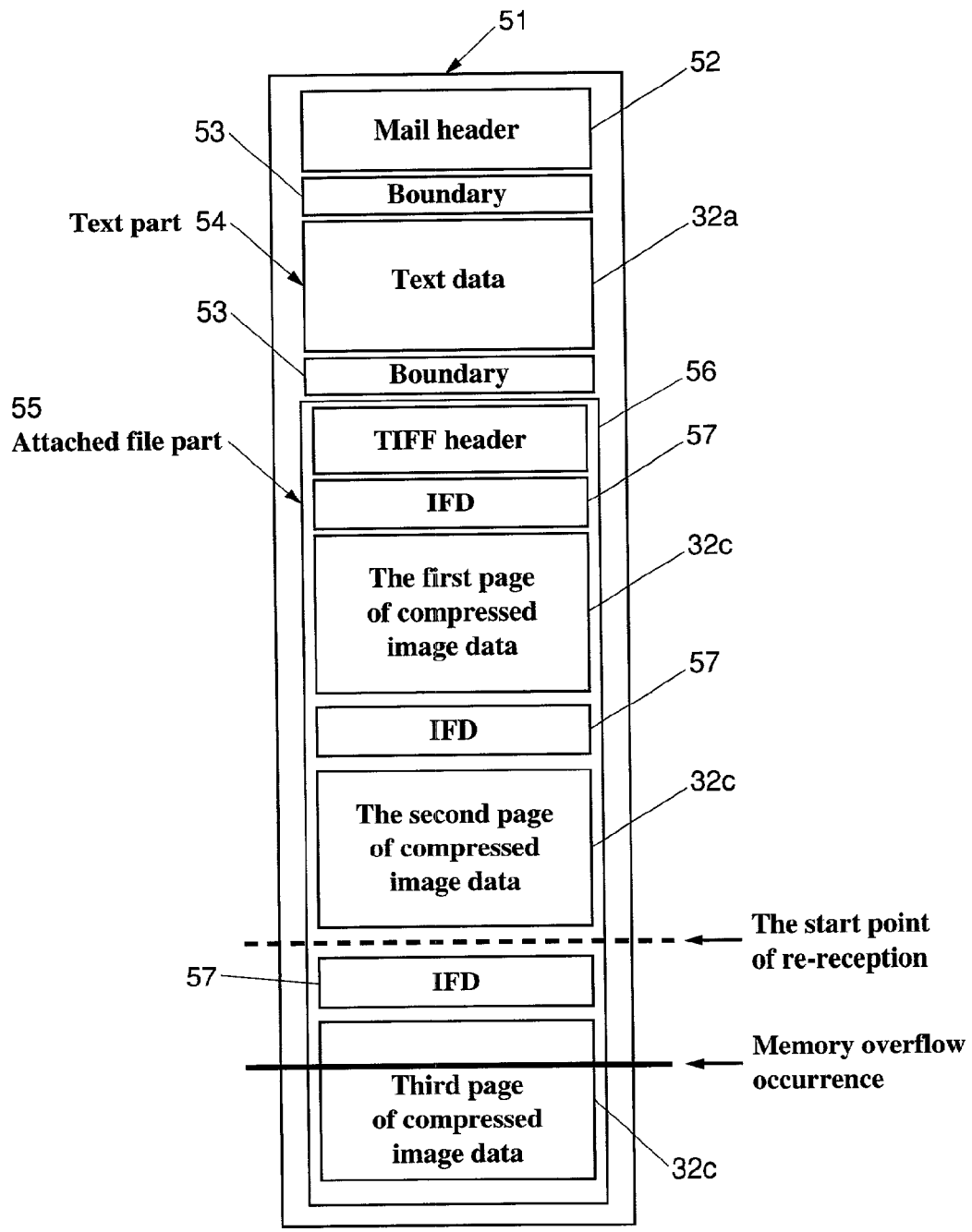
FIG. 5 is a pattern diagram showing multipart structure of email data received by the Internet facsimile apparatus of the embodiment mentioned above.

MIME process section 43 analyzes email data consisting of character codes inputted to the reception buffer 42 according to MIME. FIG. 5 is a pattern diagram showing multipart structure of email data received by Internet facsimile apparatus of the embodiment mentioned above. MIME process section 43 analyzes the email data 51 sequentially from the beginning. And, MIME process section 43 detects a boundary 53 defined in the mail header 52, and distinguishes a boundary of each part, based on the boundary 53. Also MIME process section 43 distinguishes contents of the part based on the contents type (ex. Content-type: text/plain; charset=iso-2022-jp) written at the top of each part and creates management information according to the contents (data in the part). MIME process section 43 stores the management information in the management area 32a of the image memory area 32. At the same time, MIME process section 43 stores data in the part in the image memory area 32 and outputs the data to a process section appropriate to the data in the part when necessary.

More specifically, when the MIME process section 43 detects the text part 54, management information showing it is created. And the MIME process section 43 stores it in the management area 32a shown in FIG. 4. At the same time, it stores text data 32b in the image memory area 32. Also when the MIME process section 43 detects the attached file part to which TIFF file data is attached, the MIME process section 43 creates management information showing it and stores it in the management area 32a. At the same time, the MIME process section 43 outputs TIFF file data 56 character-coded in Base 64 format to the Base64 decoding section 44. The Base64 decoding section 44 decodes the inputted data. Since the TIFF file data 56 has compressed image data (MH data) 32c in the order of document pages, the Base64 decode section 44 stores compressed image data 32c in areas of the image memory area 32 after decoding each page. Here, a page boundary is distinguished by the IFD57.

The text data 32*b* and the compressed image data 32*c* stored in the image memory area 32 are printed at the printer 28 after appropriate processing the data process section 37. More specifically, a data readout process section 45 of the data process section 37 sequentially reads out the text data 32*b* or the compressed data 32*c* stored in the image memory area 32 from the beginning. In this process, the management information about the readout data (hereafter referred to as read data) from the management area 32*a* is read out together with the text data and image data. The text data 32*b* and the compressed image data 32*c* are output to an appropriate terminal based on the management information. In other words, when the read data is recognized as text data 32*b* based upon the management data, it is output to a BMP (Bitmap) conversion section 46 and transferred to the page memory 47 of the printer 28 after being converted to BMP data. On the other hand, when the read data is recognized as compressed image data 32*c* based upon the management information, it is outputted to the image compression/decompression circuit 24 and transferred to the page memory 47 of the printer 28 after decompressing to BMP data.

A data erasing section 48 is provided in the data process section 37 erases text data 32*b* or compressed image data 32*c* in the image memory area 32 when the data is printed normally at the printer 28. As a result, the occupied memory area is released.

The memory overflow detection section 33 connected to the image memory area 32 detects an occurrence of memory overflow. When memory overflow is detected, the memory overflow detection section 33 outputs a signal indicating a memory overflow (hereafter referred to as overflow notifying signal) to POP3 protocol process section 41. Occurrence of memory overflow can be detected, for example, by comparing the size of the image memory area to the total size of compressed image data stored so far.

When receiving a overflow notifying signal, POP3 protocol process section 41 immediately interrupts email data reception, signs off, disconnects communication and discontinues email reception without erasing the email data from POP3 server 10.

When the reception of the data is interrupted, the page number/mail information acquisition section 34 stores the page number at the interruption based counted page number (hereafter referred to as interrupted page number) in the data memory area 35. At the same time, the page number/mail information acquisition section 34 stores mail information such as message ID (hereafter referred to as interrupted message ID) and subject of the email when interruption occurs (hereafter referred to as interrupted email) in the data memory area 35.

Figure 6:
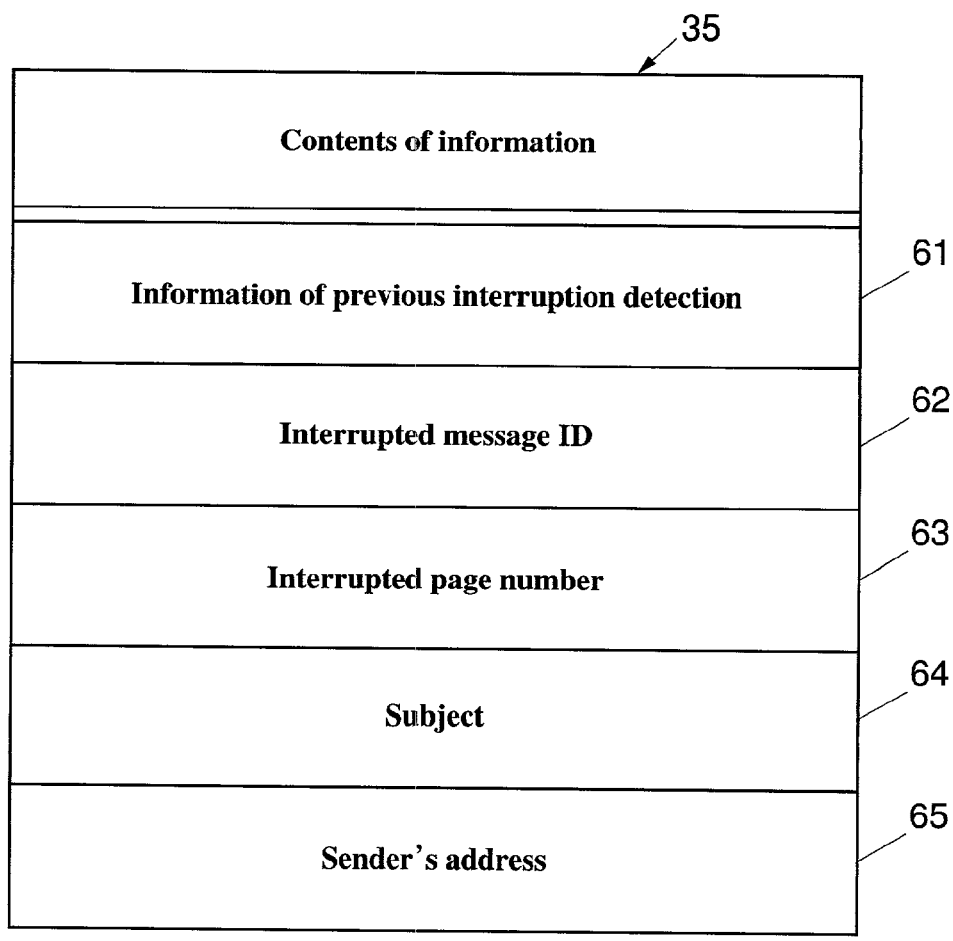
FIG. 6 is a drawing showing the contents of the data memory area of the Internet facsimile apparatus of the embodiment mentioned above.

FIG. 6 shows the structure of data memory area of the Internet facsimile apparatus of the embodiment mentioned above. Previous interruption detection information 61 that shows interruption of the previous reception, message ID 62 of the interrupted email, interrupted page number 63, the subject 64 of the email and sender's address 65 are stored in the data memory area 35.

Figure 7:
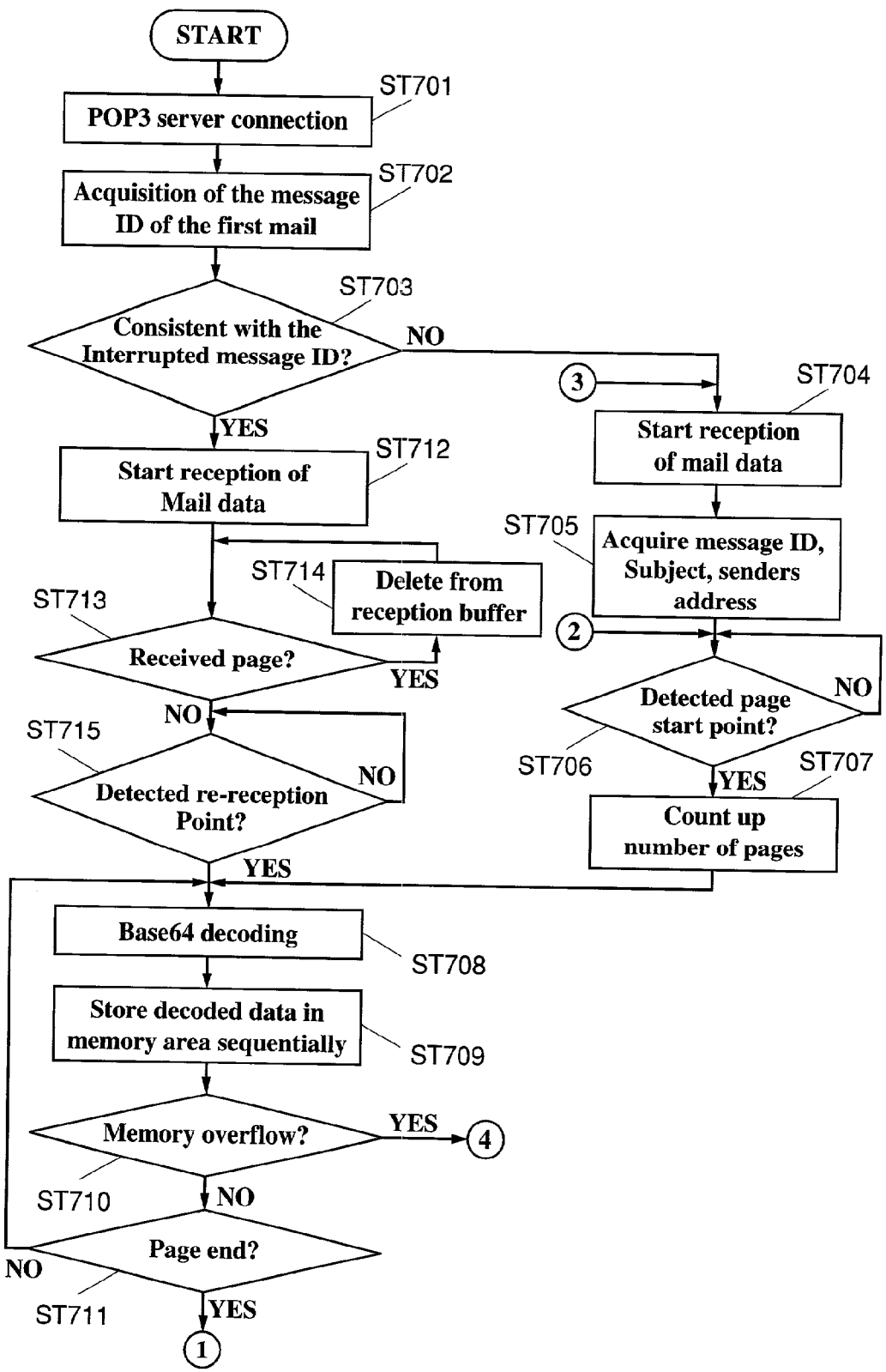
FIG. 7 is a flow chart showing the email reception operation of the Internet facsimile apparatus of the embodiment mentioned above.
Figure 8:
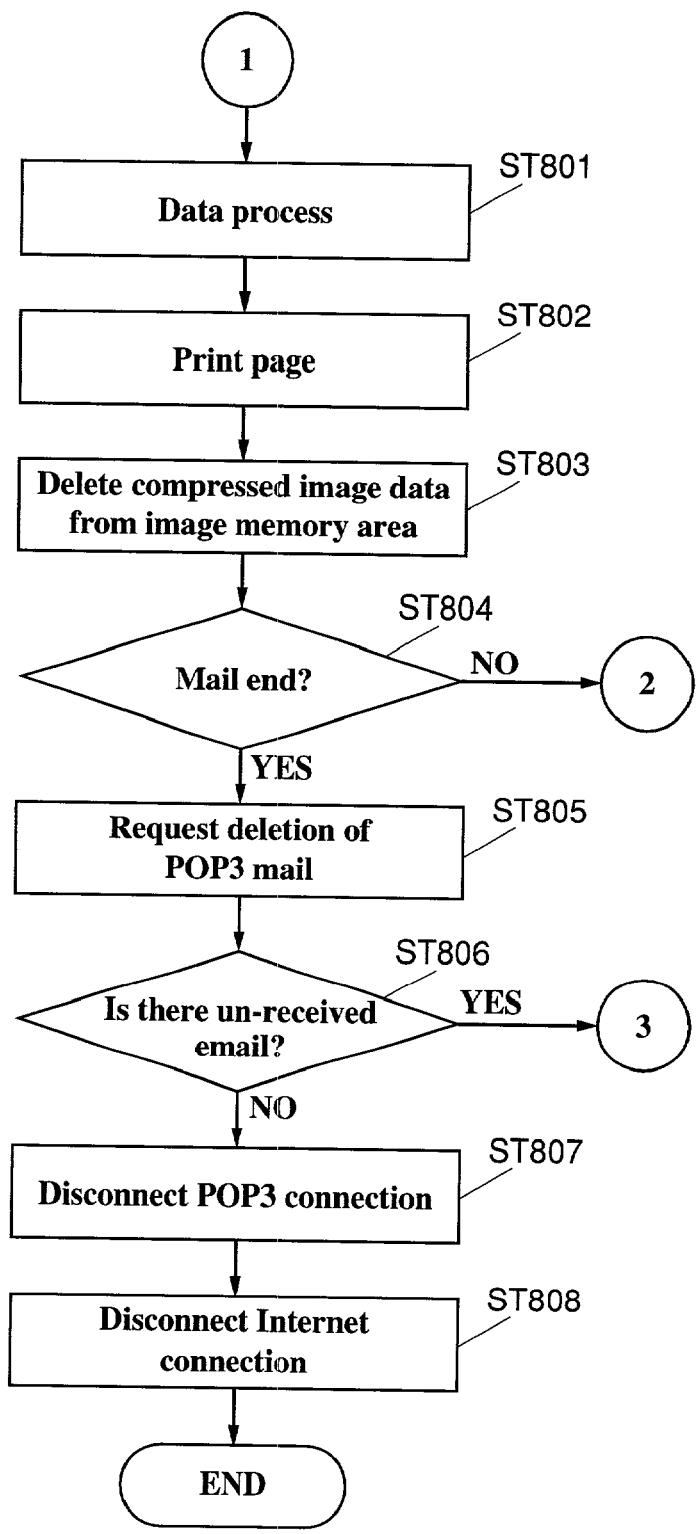
FIG. 8 is a flow chart showing the continuation of the email reception operation as shown in FIG. 7 for the Internet facsimile apparatus of the embodiment mentioned above.
Figure 9:
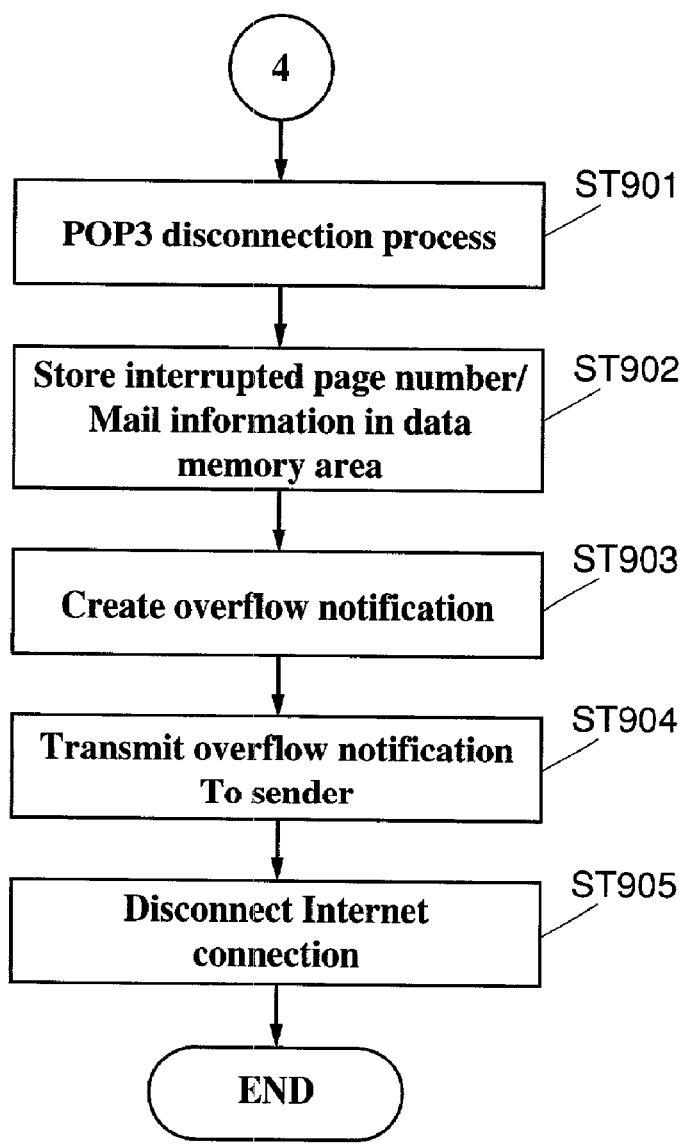
FIG. 9 is a flow chart showing the continuation of the email reception operation as shown in FIG. 7 for the Internet facsimile apparatus of the embodiment mentioned above.

FIG. 7 to FIG. 9 are flow charts showing the email reception operation of Internet facsimile apparatus of the embodiment mentioned above. Hereafter, it is assumed for convenience that only a TIFF file is attached to an email and there is no text part. Description is given based on the example where a page of an email is each compressed image data in TIFF file and the starting point of each page is distinguished by IFD.

In FIG. 7, the mail reception process section 31 controls the modem 26 to connect to the Internet 5, and establishes a connection to the POP3 server 10 (ST701).

After establishing the connection, POP3 protocol process section 41 acquires message ID of the first email received at the POP3 server 10 (ST702). Then, the POP3 protocol process section 41 compares the obtained message ID and interrupted message ID62 stored in the data memory area 35 (ST703). When they are not consistent (NO), in other words, when interruption did not previously occur, then the process advances to ST 704. On the other hand, when both are consistent, in other words, when interruption previously occurred and interrupted email is still in POP3 server 10, it goes to ST712. Here, the case that there was no interruption previously is described.

If NO in ST703, the POP3 protocol process section 41 starts receiving the first email data (ST704). The page number/mail information acquisition section 34 acquires mail information such as message ID, subject, and sender's address (ST705) in the email data of the reception buffer 42. The page number/mail information acquisition section 34 checks if the starting point of a page is detected from received email data (ST706). If NO in ST706, it continues receiving email data until the starting point of a page is detected. If YES in ST706, the page number/mail information acquisition section 34 increments the page count number.

After that, Base64 decoding section 44 decodes the compressed image data 32*c* in TIFF file data 56, that is encoded to text code as shown in FIG. 4 (ST708). The decoded data are sequentially stored in the image memory area 32 (ST709).

The memory overflow detection section 33 continuously detects if the memory area 32 overflows or not. In ST710, it is checked whether the memory overflow is detected. If NO in ST710, then it is judged if the received mail data is at the page end or not (ST711). When received mail data is decoded to the end of a page, the data process section 37 executes data processing of compressed image data of one page (FIG. 8, ST801). Then the printer 28 prints the data (ST802). After that, the data erase section 48 erases the printed compressed image data 32*c* from the image memory area 32 (ST803).

Judging if it is mail end or not (ST804), if NO, then process goes to ST706 of FIG. 7 and compressed image data of a next single page is received and printed. On the other hand, if YES in ST804, the POP3 protocol process section 41 requests the POP3 server 10 to erase received email data (ST805). Then, it is checked if there is un-received email in the POP3 server 10 or not (ST806). If YES then process goes to ST704 and next email data are received and printed. On the other hand, If NO in ST806, the POP3 protocol process section 41 disconnects POP3 line (ST807), then disconnects the Internet connection via the modem 26 (ST808) and ends the process.

If YES in ST710 in FIG. 7, in other words, if the memory overflow detection section 33 detects memory overflow, the POP3 protocol process section 41 interrupts reception of email data (FIG. 9, ST901). The interrupted email data remains in the POP3 server 10. After that, the page count number at interruption serving as an interrupted page number and, the mail information acquired by the page number/mail information acquisition section 34 in ST705 serving as an interrupted mail information, are stored in the data memory area 35 respectively.

Then the mail creation/transmission process section 36 in FIG. 3 creates overflow notification mail (ST903) and transmits the mail to the sender's address of interrupted email that is obtained and stored in ST705 (ST904). After that, Internet connection via the modem 26 is disconnected (ST905) and process is ended.

Up to this step, the data received until the occurrence of a memory overflow, except interrupted email data, are stored in the image memory area 32 as shown in FIG. 5. This data is called the data corresponding to received pages.

Next, the case that interruption previously occurred is described. If, in ST703 of FIG. 7, the message ID of ST702 agrees with the interrupted message ID, reception of interrupted email data left in POP3 server 10 starts (ST712). It is first judged if the data being received has already been received or not (ST713). More specifically, the receiving page number (the count number by the page number/mail information acquisition section 34) and the interrupted page number are compared and, if the former is smaller than the latter, it is decided that the data being received is the data corresponding to the received pages. Thus, if YES, the received data is deleted from the reception buffer 42 without processing. (ST714)

If NO in ST713, the start point of re-reception is detected (ST715). Here the start point of re-reception corresponds to the start point of an un-received page. When the start point of re-reception is detected, then data (compressed image data) of un-received pages are received, decoded and printed.

As described above, when memory overflow occurs at image memory area 32, reception of email data is interrupted and page number received at the interruption (interrupted page number) is memorized. Then, the connection to POP3 server 10 is established again and the character code data corresponding to the pages before the interrupted page (received pages) are deleted from the reception buffer 42 without any processing (decoding, storage in the image memory area 32, and printing) when interrupted email data are received. On the other hand, the data corresponding to the pages after the interrupted page number (un-received pages) are decoded. The obtained compressed data are stored in the image memory area 32. Then the data are printed out.

In other words, the received data that is received before memory overflow is deleted from the reception buffer 42, while the remaining data that is un-received are stored in the image memory area 32. Thus it is possible to prevent memory overflow to occur again upon the re-reception. Since it is not necessary to erase interrupted email data from POP3 server 10 or to skip receiving the interrupted mail, a email receiver with relatively small memory capacity can reliably receive and print out email data that is larger than the memory capacity.

As causes for the possibility for the image memory area 32 to overflow, the case that one email data is large (larger than the size of image memory area 32) and the case that a total size of plural email data is large are both included. However, the present invention is more effective because re-reception is possible when one email data is large and the email data is left in POP3 server at the interruption.

From a different point of view of the embodiment mentioned above, email data reception is interrupted and the interrupted page number is memorized when the image memory area 32 overflows. The compressed image data corresponding to the pages received before the interruption are erased from the image memory area 32 after being printed by the printer 28. Then POP3 server 10 is accessed again and the compressed image data corresponding to the pages printed are deleted from the reception buffer 42 without any processing when interrupted email data are received. On the other hand, the printer 28 prints the compressed image data corresponding to the pages that were previously not printed. Thus it is possible to avoid printing the data corresponding to the pages received and printed before the interruption, upon re-reception .

In the embodiment described above, in ST903 and ST904 of FIG. 9, the mail creation/transmission section 36 creates an overflow notification mail and transmits to the sender's address of the interrupted email. Thus it is possible for the sender to know that email reception is interrupted because of memory overflow in IFAX terminal apparatus of the addressee.

The present invention is not limited by the embodiments mentioned above. For example, in the embodiments mentioned above, the received page number (interrupted page number) is memorized when reception is interrupted by memory overflow. However, instead of this, it is also possible that the numbers of pages that are completed before the interruption (received number of pages) are memorized and the pages corresponding to the non-received pages after the received pages are stored selectively in the memory area 32. This provides the same effect as the embodiments mentioned above.

It is also possible to memorize the size of the data received before the interruption (received size) and to store the non-received data after the received size in the image memory area 32 upon re-reception.

Though the case that memory overflow occurs at the attached TIFF file part of an email in the embodiments mentioned above was described as an example, it is also possible to apply the present invention to the case that memory over flow occurs at the text part and the case that memory overflow occurs during receiving an email consisting only of a text part. In these cases, unit of one page is number of characters and number of lines defined at apparatus and the page start point is based on number of characters and lines.

In the embodiments mentioned above, the case is given that email data are all printed. However, it not always necessary to print email data. The present invention can be applied to such an email receiver wherein received email is stored in memory (memory devices such as SRAM and DRAM, removable memory devices such as memory card) and is displayed at a display device.

The present invention can be deployed by any usual commercial digital computer and a micro processor programmed according to the technology mentioned in the embodiment mentioned above, which is obvious to a person having ordinary skill in the art. Also the present invention includes the computer program developed based on the technology mentioned in the embodiments mentioned above, which is obvious to a person having ordinary skill in the art. The present invention covers computer program products of recording media that can be used to program a computer for deploying the present invention. The recording media includes floppy disk, optical disk, disks such as CDROM and magnetic disk, ROM, EPROM, magneto-optical card, memory card and DVD, but is expressly not limited to these examples.

This application is based on the Japanese Patent Application No. 2001-2836, entire content of which is expressly incorporated by reference herein.

What is claimed is:

1. A receiving Internet facsimile apparatus connectable to a mail server via a network, the receiving Internet facsimile apparatus comprising:
    a communicator configured to receive, from the mail server via the network, a single e-mail to which a plurality of pages of image data are attached;
    a decoder configured to decode the plurality of pages of image data attached to the received single e-mail, each of the plurality of pages of image data being defined by compressed image information provided between headers;

a memory configured to store the plurality of pages of the decoded image data; and a controller configured to determine whether the memory overflows due to the reception of the single e-mail, to stop receiving the single e-mail when it is determined that the memory overflows due to the reception of the single e-mail, the controller, when the single e-mail is re-received from the mail server after the stop in receiving of the single e-mail, being further configured to re-receive the single e-mail to which the plurality of pages of the image data are attached, to determine that a predetermined page was not stored in the memory when the single e-mail was previously received from the mail server, to decode the predetermined page of the image data attached to a re-received single e-mail, and to store, in the memory, the predetermined page of the decoded image data attached to a re-received single e-mail, the predetermined page being distinct from any of the plurality of pages of the image data previously received from the mail server, wherein the controller is configured to prevent decoding and storing in memory of image data previously received from the mail server.

2. The receiving Internet facsimile apparatus according to claim 1, wherein, when it is determined that the memory overflows, the controller notifies a user of a transmitting apparatus that transmitted the single e-mail to the receiving Internet facsimile apparatus, that the memory of the receiving Internet facsimile apparatus overflows.

3. The receiving Internet facsimile apparatus according to claim 1 further comprising a printer configured to print data, wherein, when the printer prints the plurality of the pages of the decoded image data, the controller erases, from the memory, the plurality of the pages of the decoded image data.

4. The receiving Internet facsimile apparatus according to claim 1, wherein the controller determines a received last page of the decoded image data, as a page of image data that was stored in the memory before the memory overflow, determines that a page received after the received last page of the decoded image data is the predetermined page of the image data to be decoded, and decodes and stores the predetermined page of the image data in the memory, when the single e-mail is re-received from the mail server after the stop in receiving of the single e-mail.

5. The receiving Internet facsimile apparatus according to claim 1, wherein the memory stores a last page number, the last page number indicating a last page of the decoded image data stored in the memory when the receiving of the single e-mail was stopped, and the controller determines that a page of the image data received after the page indicated by the last page number is the predetermined page of the image data to be decoded, and decodes and stores the predetermined page of the image data in the memory, when the single e-mail is re-received from the mail server after the stop in receiving of the single e-mail.

6. The receiving Internet facsimile apparatus according to claim 1, wherein the memory stores a number of pages of the decoded image data stored in the memory when the receiving of the single e-mail was stopped, and the controller determines the predetermined page of the image data to be decoded, based on the number of the pages of the decoded image data stored in the memory, and decodes and stores the predetermined page of the image data in the memory, when the single e-mail is re-received from the mail server after the stop in receiving of the single e-mail.

7. The receiving Internet facsimile apparatus according to claim 1, wherein the memory stores a data amount of the decoded image data stored in the memory when the receiving of the single e-mail was stopped, and the controller determines the predetermined page of the image data to be decoded, based on the data amount of the decoded image data stored in the memory, and decodes and stores the predetermined page of the image data in the memory, when the single e-mail is re-received from the mail server after the stop in receiving of the single e-mail.

8. A method for receiving, at a receiving Internet facsimile apparatus from a mail server via a network, a single e-mail to which a plurality of pages of image data are attached, the method comprising:

decoding the plurality of pages of the image data attached to the single e-mail, each of the plurality of pages of image data being defined by compressed image information provided between headers;

storing, in a memory, the plurality of pages of the decoded image data;

determining whether the memory overflows due to the reception of the single e-mail;

stopping receiving of the single e-mail when it is determined that the memory overflows due to the reception of the single e-mail;

re-receiving the single e-mail to which the plurality of pages of the image data are attached, when the single e-mail is re-received from the mail server after the stop in receiving of the single e-mail;

determining that a predetermined page was not stored in the memory when the single e-mail was previously received from the mail server;

decoding the predetermined page of the image data attached to a re-received single e-mail; and storing, in the memory, the predetermined page of the decoded image data attached to a re-received single e-mail, the predetermined page being distinct from any of the plurality of the pages previously received from the mail server, wherein decoding the predetermined page comprises decoding the predetermined page without decoding and storing image data previously received from the mail server.

9. The method according to claim 8 further comprising notifying a user of a transmitting apparatus that transmitted the single e-mail to the receiving Internet facsimile apparatus, that the memory of the receiving Internet facsimile apparatus overflows, when it is determined that the memory overflows.

10. The method according to claim 8 further comprising printing the plurality of the pages of the decoded image data, and erasing, from the memory, the plurality of the pages of the decoded image data when the plurality of the pages of the decoded image data are printed.

11. The method according to claim 8 further comprising:
determining a received last page of the decoded image data, as a page of the image data that was stored in the memory before the memory overflow, when the single e-mail is re-received from the mail server after the stop in receiving of the single e-mail;

determining that a page received after the received last page of the decoded image data is the predetermined page of the image data; and decoding and storing the predetermined page of the image data in the memory.

12. The method according to claim 8 further comprising:
storing, in the memory, a last page number, the last page number indicating a last page of the decoded image data stored in the memory when the receiving of the single e-mail was stopped;

determining that a page of the image data received after the page indicated by the last page number is the predetermined page of the image data to be decoded, when the single e-mail is re-received from the mail server after the stop in receiving of the single e-mail; and decoding and storing the predetermined page of the image data in the memory.

13. The method according to claim 8 further comprising:

storing, in the memory, a number of pages of the decoded image data stored in the memory when the receiving of the single e-mail was stopped;

determining the predetermined page of the image data to be decoded, based on the number of the pages of the decoded image data stored in the memory, when the single e-mail is re-received from the mail server after the stop in receiving of the single e-mail; and decoding and storing the predetermined page of the image data in the memory.

14. The method according to claim 8 further comprising:

storing, in the memory, a data amount of the decoded image data stored in the memory when the receiving of the single e-mail was stopped;

determining the predetermined page of the image data to be decoded, based on the data amount of the decoded image data stored in the memory, when the single e-mail is re-received from the mail server after the stop in receiving of the single e-mail; and decoding and storing the predetermined page of the image data in the memory.

15. A receiving Internet facsimile apparatus connectable to a mail server via a network, the receiving Internet facsimile apparatus comprising:

a communicator configured to receive, from the mail server via the network, an e-mail to which a plurality of pages of image data are attached;

a decoder configured to decode the plurality of pages of image data attached to received e-mail, each of the plurality of pages of image data being defined by compressed image information provided between headers;

a memory configured to store the plurality of pages of the decoded image data;

a controller configured to determine whether the memory overflows during the reception of an e-mail, and to stop receiving the e-mail when it is determined that the memory overflows;

the controller being further configured to, when an e-mail is received from the mail server, determine whether the e-mail was previously received and subject to a stop in receiving, or whether the e-mail was not previously received and when it is determined that the e-mail was previously received and which resulted in a memory overflow, to determine which pages of image data attached to the e-mail were previously received prior to the memory overflow and which pages of image data attached to the e-mail were not previously received;

the controller being further configured to decode only pages of the image data attached to the received e-mail that were not previously received and to store the decoded pages in memory and to prevent decoding and storing in memory of image data previously received from the mail server.

16. The receiving Internet facsimile apparatus according to claim 15 wherein, upon the controller determining that a received page of image data was previously received, to delete the previously received page from a reception buffer without decoding the image data of the received page.

* * * * *